J. E. A. GIBBS.
SEWING MACHINE.
No. 2,655. Reissued June 18, 1867.
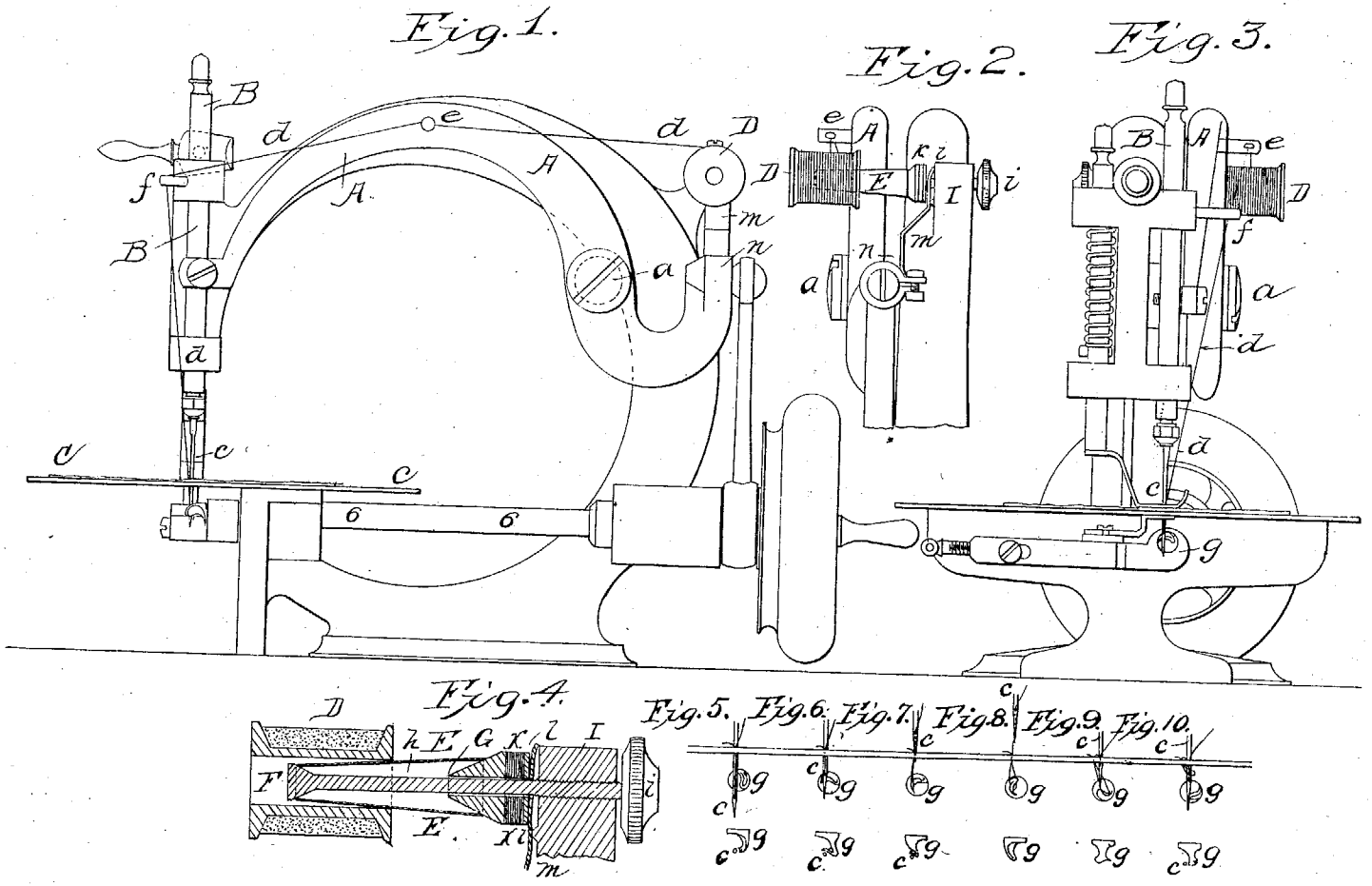

United States Patent Office.

JAMES E. A. GIBBS, OF MIDWAY, VIRGINIA.

*Letters Patent No.* 21,129, *dated August* 10, 1858; *reissue No.* 2,655, *dated June* 18, 1867.

IMPROVEMENT IN SEWING MACHINES.

The Schedule referred to in these Letters Patent and making part of the same.

TO ALL WHOM IT MAY CONCERN:

Be it known that I, JAMES E. A. GIBBS, late of Millpoint, in the county of Pocahontas, and State of Virginia, but now of Midway, in the county of Rockbridge, and State of Virginia, have invented certain new and useful Improvements in Sewing Machines, of which the following is a full, clear, and exact description, reference being had to the accompanying drawing, which forms part of this specification, and in which—

Figure 1 represents a side elevation of the machine.

Figure 2, a rear end elevation of the upper portion of the machine in part.

Figure 3, a front end elevation of the machine.

Figure 4, a horizontal section, on an enlarged scale, of the spool-tension appliances.

Figures 5, 6, 7, 8, 9, and 10, diagrams in illustration of the hook or looper and needle at different parts of their stroke, and showing their action on and with the thread.

The one portion of my present improvement relates to the general arrangement of the sewing machine, comprising the parts whereby the sewing mechanism is brought into operative relation so as to insure greater convenience in the working of the machine, admitting for a given size of machine of the greatest possible space under the needle-arm, while accessibility to the mechanism for the easy oiling and cleaning of the same is provided, and the machine altogether rendered more compact and light than by any other arrangement known.

The second portion of my said improvement relates exclusively to single-thread sewing machines, in which the thread is worked into a chain-stitch by the combined action of a revolving hook or looper and reciprocating needle, as already secured to me by Letters Patent of the United States bearing date June 2, 1857.

The other portions of my present improvement relate to a tension arrangement to the thread and spool, especially advantageous when working in concert with my improved form of revolving hook herein specified, and applicable to other kinds of sewing machines besides the revolving hook and reciprocating needle single-thread machines before referred to.

In the following description only cursory reference will be made to such devices or plates as are common and well known in sewing machines of a special or general order, and some of such well-known appliances I shall not at all refer to here, such as the automatic feeding arrangement to the cloth, cloth-holder, &c., as these may be varied at pleasure, and form no part of my present improvement. Suffice it then to say that the general construction of this machine is suited to meet peculiarity in operation of the appliances which relate to my present improvement.

The main frame is cast in the shape of a ring, open at one side and set on a base or pedestal tangential thereto. At the part where the ring is open it terminates at one end, *i. e.*, the upper end, into upright guides, through which the stems of the pressure-pad and the needle-bar are inserted and have their up-and-down play. The other end, *i. e.*, the lower end, terminates into an upright standard which supports the table upon which the cloth rests. The ring I prefer to make somewhat diminishing in thickness towards either end, and at that part where it is thickest, or thereabout, I apply the pivot, upon which the needle-arm has its vibratory play. This needle-arm is shaped similarly to the main casting, with the exception of its rear portion, which is so twisted as to afford of convenient connection with the eccentric on the shaft. Thus the general appearance of the machine will be that of a Roman letter G, or of a hoop, open at one side where the table is interposed, which not only stamps it with a peculiar character, but is also exceedingly useful, as it affords the greatest possible space for the cloth or material to be sewed of being turned and twisted under the needle and upon the table. Also the hook, feed-bar, and main shaft being by this arrangement above the stand, are easily oiled and cleaned, and are readily adjusted in conformity with the requirements of the work. The reciprocating needle-arm A is here shown to work as a beam on a fulcrum, *a*, near the rear of the machine, and made to oscillate by its tail end, being geared by connecting-rod with an eccentric on the hand-wheel shaft *b*. The needle-holder B is suitably connected with the needle-arm in front, and so guided as to secure it by the action of the needle-arm a straight up-and-down motion, and the reciprocating needle *c* is attached to the holder in any required manner. The bed or table C is of course punctured or slotted for the play of the needle, with the thread through it, and for the action of the cloth-feeding contrivance if arranged from below. The thread *d* is passed from a spool, D, in the rear, through an eye-piece, *e*, projecting from the needle-arm, and through an eye-piece, *f*, in front, down to and through the eye of the needle. The operating-shaft *b* is provided at its front end with a hook or looper, *g*, as in the machine already patented to me before referred to, but the construction of the revolving hook is different, and its action on the loop brought down by the needle, and the relative arrangement and operation of the needle to the hook is also different, which change or peculiarity of form, action, and relative arrangement is clearly indicated in the diagrams, figs. 5, 6, 7, 8, 9, and 10 of the accompanying drawing, through the form, action, and arrangement of the hook and needle are not, of course, restricted [precisely as here shown, so long as their peculiar character is similar to my previous patented arrangement, which is well suited for certain kinds of work. The revolving hook opens the loop brought down by the needle, draws it sidewise, and holds it spread open in the path of the needle at the next stroke, so that the needle shall pass through it, and then releases the first loop and takes up that which is made by the last stroke of the needle, which withdraws and leaves the first loop held by that now upon the hook, and so on in continuous succession. Thus two loops are upon the hook at one time, and the hook must necessarily be of comparatively large dimensions to effect the action here only generally described. The hook carried the one loop through the preceding loop. Each loop had to be greatly distended, and the needle having released it and not acting as a guide to it, it was consequently liable to "kink," the needle having a restricted downward stroke to about or above the axis only of the hook by reason of the necessary peculiar configuration of the latter. My present arrangement is very different. I combine the well-known advantages of a hook revolving in one direction only with the advantages of the reciprocating hook in other single-thread chain-stitch machines. Thus, as will be seen on reference to the drawing, the needle may descend, as shown in fig. 5, far below the hook, which in this figure is approaching its position to take hold of the loop, that, as the thread retreats, is caught by the revolving hook, as shown in fig. 6, and as the needle further retreats is drawn or held, and partially opened and twisted, as shown in fig. 7. The needle further retreating and the hook continuing its rotation, the loop is spread to its maximum of opening, and twisted, as shown in fig. 8, and as the needle again advances and hook continues to revolve, said loop, while on the hook, receives the needle through it, as shown in fig. 9, after which the hook detaches the loop from it. As the needle continues to advance, said loop is drawn up in advance of the hook, as shown in fig. 10, and the former loop wholly drawn up before the hook takes a fresh loop. As in reciprocating hook single-thread sewing machines, the hook or looper may be so constructed that the loops formed by its operation may be comparatively very small, which is a great advantage in sewing machines, because the liability of the thread to form "kinks" is least when the least quantity of thread is employed in the loop. The needle passes the one loop through the preceding loop, as in such machines, whereby the said preceding loop is kept from kinking by the needle descending while said loop is being drawn up, over, or on and along it. The spool D is fitted or pushed on tight to a conical sleeve, E, that is supported and turns on two immense cones, F and G, one at either end. These inner cones are arranged to face in reverse direction, so that if pressed toward each other they will bear endwise on the sleeve E, in opposite directions, to bind it and prevent or restrain it and the spool carried by it from turning. Disks might take the place of cones and be arranged to act equivalently. The one cone, F, has an elongated spindle, *h*, on which the inner cone, G, is fitted and slides. This spindle has a screw-thread on its back end which fits into and through a screwed hole in the standard I of the machine. Said spindle has a rosette, *i*, to turn it by. Back of the inner cone G is an India-rubber disk or spring, *k*, with a washer, *l*, in rear of it, and against this washer a lever or arm, *m*, is brought to bear, and is so arranged that the tail end *n* of the needle-beam during its upward stroke, which corresponds with the downward stroke of the needle, rubs on or actuates said lever *m* to compress the spring *k*, and so by the sliding inner cone G being made to bear with increased tightness against the one end of the conical sleeve E, and the other end of said sleeve forced with increased tightness against the cone F, the sleeve E with its spool D is securely held from turning, or so that it can only be turned with difficulty. This takes place after the needle has had its slack or fresh feed of thread supplied it, which is done only at intervals, as usual in other machines, and need not, therefore, be specially described here. At the intermediate interval, when fresh thread is being supplied and the hook or looper is drawing down, spreading and twisting the loop, the conical sleeve E and spool D are not so held, but left free to turn or to turn more freely, by the reason of the tail end *n* of the needle-beam not bearing at such times on the lever *k*. Thus is a variable tension produced, which is to be regulated so that there be a certain "mean" or general tension as well. The spool when "free" should not run too loose, or more thread might be let out than needed; nor need it be so firmly held as to risk breakage of the thread. This general tension, as well as the arrangement shown in the drawing, admits of, by turning either the one way or the other, the rosette *i* of the screw-spindle *h*, so as to wedge more closely or relieve of friction the inner cones and conical sleeve which carries the spool as a fixture to it.

Having thus fully described my said improvement, what I claim as my invention, and desire to secure by Letters Patent, is—

The general arrangement of a sewing machine comprising the parts whereby the sewing mechanism is brought into operative relation, substantially as herein shown and described, that is to say, combining with the vibrating needle-arm a frame shaped substantially like the the Roman letter G, as herein shown and described and for the purpose set forth.

I also claim so constructing and combining, or arranging and operating, a revolving hook or looper with a reciprocating needle, as that the one loop shall be taken from the needle after the former loop shall have been drawn up, on, along, or over the needle during its advance movement, in the manner and for the purpose substantially as described.

I also claim the conical sleeve, or its equivalent, for holding the spool and for revolving therewith, in combination with the adjustable cones F and G, or their equivalents, for producing the requisite degree of friction upon the conical sleeve spool-holder, when constructed and arranged so as to operate substantially in the manner and for the purpose herein set forth.

In testimony whereof I have signed my name to this specification before two subscribing witnesses.

JAS. E. A. GIBBS.

Witnesses:

A. POLLOK,

EDM. F. BROWN.